(12) United States Patent
Remboski et al.

(10) Patent No.: US 11,585,429 B2
(45) Date of Patent: Feb. 21, 2023

(54) LUBRICANT SUPPLY SYSTEM AND METHODS FOR A LUBRICANT SUPPORTED ELECTRIC MOTOR

(71) Applicant: Neapco Intellectual Property Holdings, LLC, Farmington Hills, MI (US)

(72) Inventors: Donald Remboski, Ann Arbor, MI (US); Jacqueline Dedo, Wolverine Lake, MI (US); Mark Versteyhe, Oostkamp (BE)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 384 days.

(21) Appl. No.: 17/030,847

(22) Filed: Sep. 24, 2020

(65) Prior Publication Data
US 2021/0088124 A1 Mar. 25, 2021

Related U.S. Application Data

(60) Provisional application No. 62/905,474, filed on Sep. 25, 2019.

(51) Int. Cl.
*F16H 57/04* (2010.01)
*H02K 9/19* (2006.01)
*B60K 7/00* (2006.01)

(52) U.S. Cl.
CPC ..... *F16H 57/0435* (2013.01); *F16H 57/0441* (2013.01); *F16H 57/0476* (2013.01);
(Continued)

(58) Field of Classification Search
CPC .... B60K 11/02; B60K 17/043; B60K 17/046; B60K 2001/003; B60K 2001/005;
(Continued)

(56) References Cited

U.S. PATENT DOCUMENTS

2014/0096641 A1 4/2014 Hoshinoya et al.
2014/0349811 A1* 11/2014 Ichikawa ............... F16D 13/74
477/83
(Continued)

FOREIGN PATENT DOCUMENTS

DE 102015207778 A1 11/2016

OTHER PUBLICATIONS

International Search Report and Written Opinion regarding corresponding PCT App. No. PCT/US2020/052656; dated Dec. 9, 2020.

*Primary Examiner* — Naishadh N Desai
(74) *Attorney, Agent, or Firm* — Dickinson Wright PLLC

(57) ABSTRACT

A lubricant supply system for an electric vehicle includes a lubricant supported electric motor and a lubricant supply line extending from a high pressure source to the lubricant supported electric motor for supplying lubricant to the lubricant supported electric motor. In one arrangement, at least one powertrain component is disposed in fluid communication with the lubricant supply line and fluidly connected in parallel with the lubricant supported electric motor for supplying lubricant to the powertrain component. In an alternative arrangement, the powertrain component is fluidly connected in series with and downstream from the lubricant supported electric motor for supplying lubricant from the lubricant supported electric motor to the powertrain component. In either arrangement, the lubricant supported electric motor is incorporated into an existing lubricant supply system of the vehicle to reduce cost and complexity relative to prior designs which required a dedicated lubricant supply for the lubricant supported electric motor.

18 Claims, 3 Drawing Sheets

(52) U.S. Cl.
CPC ............... *H02K 9/19* (2013.01); *B60K 7/0007* (2013.01); *H02K 2201/03* (2013.01)

(58) Field of Classification Search
CPC ............ B60K 2001/006; B60K 7/0007; B60Y 2306/03; B64G 1/10; B64G 1/1007; B64G 1/1085; B64G 1/242; B64G 1/66; F16H 57/0435; F16H 57/0441; F16H 57/0476; H02K 2201/03; H02K 7/006; H02K 7/088; H02K 7/116; H02K 7/14; H02K 9/19; H04B 7/185; H04B 7/18513; H04B 7/18523; H04B 7/19; H04B 7/195; H04W 84/06; Y02T 10/64
See application file for complete search history.

(56) References Cited

U.S. PATENT DOCUMENTS

| | | | |
|---|---|---|---|
| 2016/0121707 A1* | 5/2016 | Yamamoto | B60W 10/08 903/930 |
| 2019/0093757 A1 | 3/2019 | Remboski et al. | |
| 2020/0044511 A1* | 2/2020 | Remboski | H02K 7/12 |

* cited by examiner

LUBRICANT SUPPLY SYSTEM AND METHODS FOR A LUBRICANT SUPPORTED ELECTRIC MOTOR

CROSS-REFERENCE TO RELATED APPLICATION

The subject application claims priority to U.S. Provisional Application Ser. No. 62/905,474 filed on Sep. 25, 2019, the entire disclosure of which is incorporated by reference herein.

FIELD OF THE DISCLOSURE

The present disclosure relates generally to lubricant supported electric motors. More particularly, the present disclosure is directed to a lubricant supply system and methods for supplying lubricant to the lubricant supported electric motor as well as other components of a related electric or hybrid electric vehicle.

BACKGROUND OF THE DISCLOSURE

This section of the written disclosure provides background information related to lubricant supported electric motors and is not necessarily prior art to the inventive concepts disclosed and claimed in this application.

Various drivelines in automotive, truck, and certain off-highway applications take power from a central prime mover and distribute the power to the wheels using mechanical devices such as transmissions, transaxles, propeller shafts, and live axles. These configurations work well when the prime mover can be bulky or heavy, such as, for example, various internal combustion engines ("ICE"). However, more attention is being directed towards alternative arrangements of prime movers that provide improved environmental performance, eliminate mechanical driveline components, and result in a lighter-weight vehicle with more space for passengers and payload.

"On wheel" motor configurations are one alternative arrangement for the traditional ICE prime mover that distributes the prime mover function to each or some of the plurality of wheels via one or more motors disposed proximate to, on, or within the plurality of wheels. For example, in one instance, a traction motor, using a central shaft though a rotor and rolling element bearings to support the rotor, can be utilized as the "on wheel" motor configuration. In another instance, a lubricant supported electric motor, such as described in U.S. application Ser. No. 16/144,002, the disclosure of which is incorporated herein by reference, can be utilized as the "on wheel" motor configuration. While each of these "on wheel" motor configurations result in a smaller size and lighter weight arrangement as compared to the prime movers based on the internal combustion engine, they each have certain drawbacks and disadvantages.

For example, when the lubricant supported electric motor is deployed in an electric or hybrid electric powertrain, a separate lubricant supply system for the lubricant supported electric motor is required in the prior art arrangements, resulting in extra cost and a more complex lubricant system to support the integration of the lubricant supported electric motor. Additionally prior arrangements of the lubricant supported electric motor are not controlled in real-time, but rather controlled based on statically selected parameters that do not optimize performance of the lubricant supported electric motor. Accordingly, there remains a continuing need for a lubricant supported electric motor which optimizes performance over the wide range of speeds encountered in a wheel-end prime-mover application, which also reducing implementation costs and providing a smaller footprint in an electric or hybrid electric powertrain system.

SUMMARY OF THE DISCLOSURE

This section provides a general summary of the inventive concepts associated with this disclosure and is not intended to be interpreted as a complete and comprehensive listing of all of its aspects, objectives, features and advantages.

A lubricant supply system for an electric or hybrid electric vehicle includes a lubricant supported electric motor having a rotor rotatably disposed within a stator to define a gap therebetween. A lubricant supply line extends from a high pressure source to the lubricant supported electric motor for supplying lubricant to the gap and supporting the rotor within the stator. In a first embodiment, at least one powertrain component is disposed in fluid communication with the lubricant supply line and fluidly connected in parallel with the lubricant supported electric motor for supplying lubricant to the at least one powertrain component. In an alternative embodiment, the at least one powertrain component is fluidly connected in series with and downstream from the lubricant supported electric motor for supplying lubricant from the lubricant supported electric motor to the at least one powertrain component. In either embodiment, the lubricant supported electric motor is incorporated into an existing lubricant supply system of the electric or hybrid vehicle to reduce cost and complexity relative to prior designs of the lubricant supported electric motor which required a dedicated lubricant supply for the lubricant supported electric motor. Other advantages will be appreciated in view of the following more detailed description of the subject invention.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF THE ENABLING EMBODIMENTS

Exemplary embodiments will now be described more fully with reference to the accompanying drawings. In particular, a number of non-limiting embodiments of vehicle driveline components with a wheel support with or without an end gear reduction unit integrated with a wheel end motor is provided so that this disclosure will be thorough and will fully convey the true and intended scope to those who are skilled in the art. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. It should also be appreciated that the present disclosure can be utilized in connection with other types of vehicle components not described fully herein.

Figure 1:
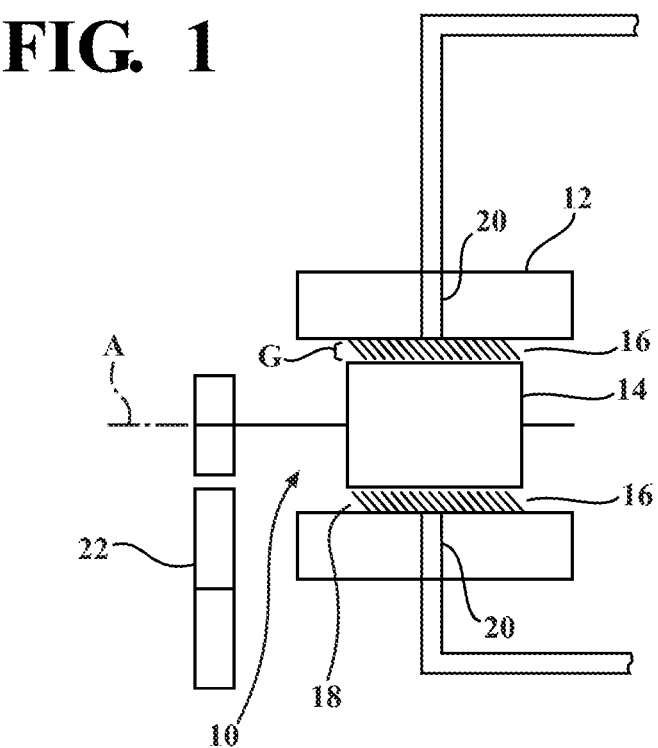
FIG. 1 is a schematic view of a lubricant supported electric motor according to an aspect of the subject disclosure.

For electric or hybrid vehicles or other devices that may be configured with an electric or a hybrid electric powertrain (e.g., manufacturing equipment, construction machinery, programmable robots, power generation devices, etc.), the size and weight of the powertrain may be reduced by replacing plain or rolling element bearings on the rotor shaft of a traction motor and using lubricant to directly support the rotor on the stator. For example, FIG. 1 illustrates a lubricant supported electric motor 10 in accordance with this disclosure. As best illustrated in FIG. 1, the lubricant supported electric motor 10 includes a stator 12 and a rotor 14 movably disposed within the stator 12 to define a gap 16 therebetween. A lubricant 18 is disposed in the gap 16 for supporting the rotor 14 within the stator 12, and providing continuous contact between these components. The lubricant 18 may therefore act as a buffer (e.g., suspension) between the stator 12 and the rotor 14 minimizing or preventing contact therebetween. In other words, the lubricant 18 prevents direct contact between the stator 12 and rotor 14 and provides an electric lubricant supported motor 10 which is robust to shock and vibration loading due to the presence of the lubricant 18. Additionally, and alternatively, a substantially incompressible lubricant 18 may be used in order to minimize the gap between the stator 12 and rotor 14.

Figure 2:
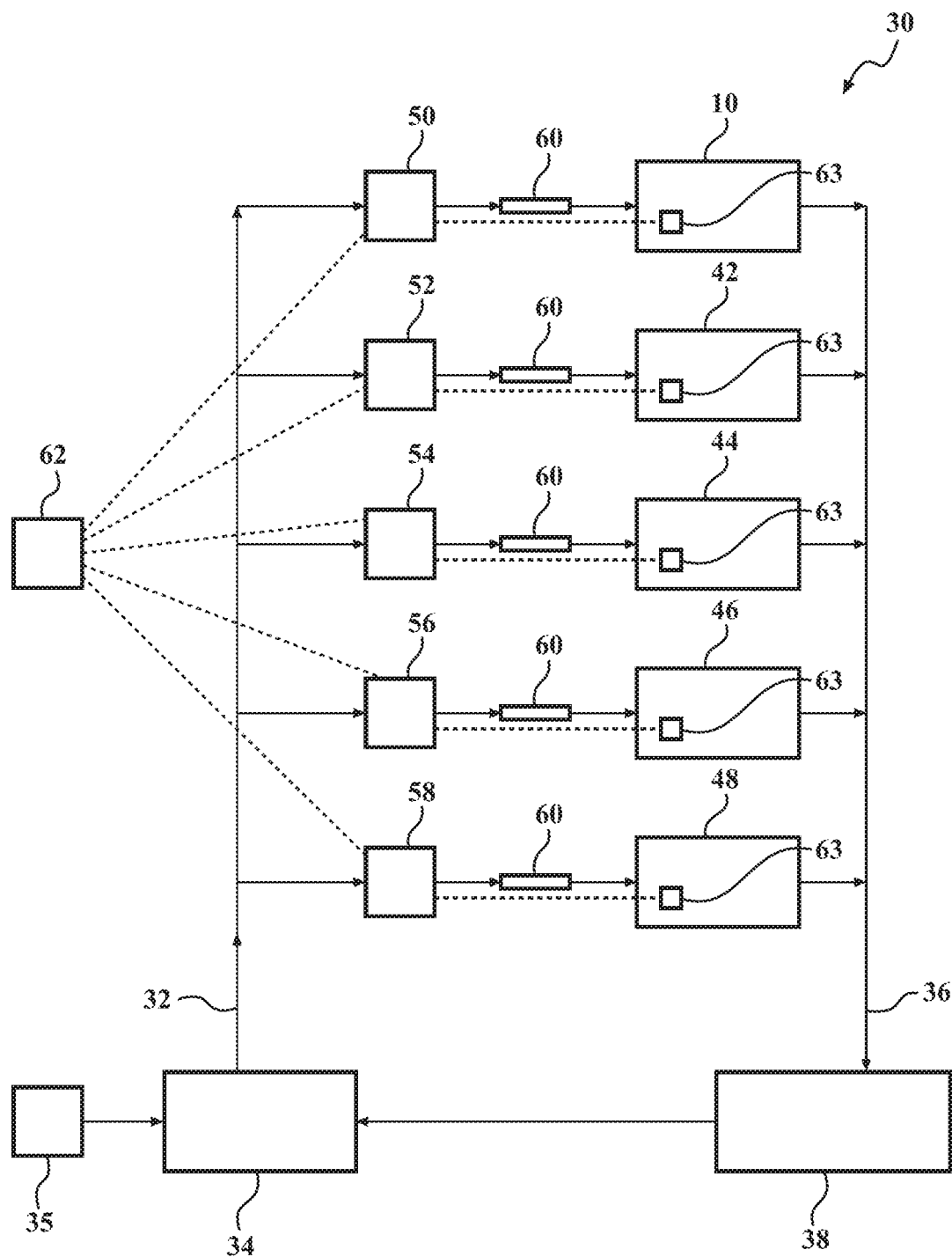
FIG. 2 is a block diagram of a lubricant supply system for the lubricant supported electric motor according to an aspect of the disclosure.
Figure 3:
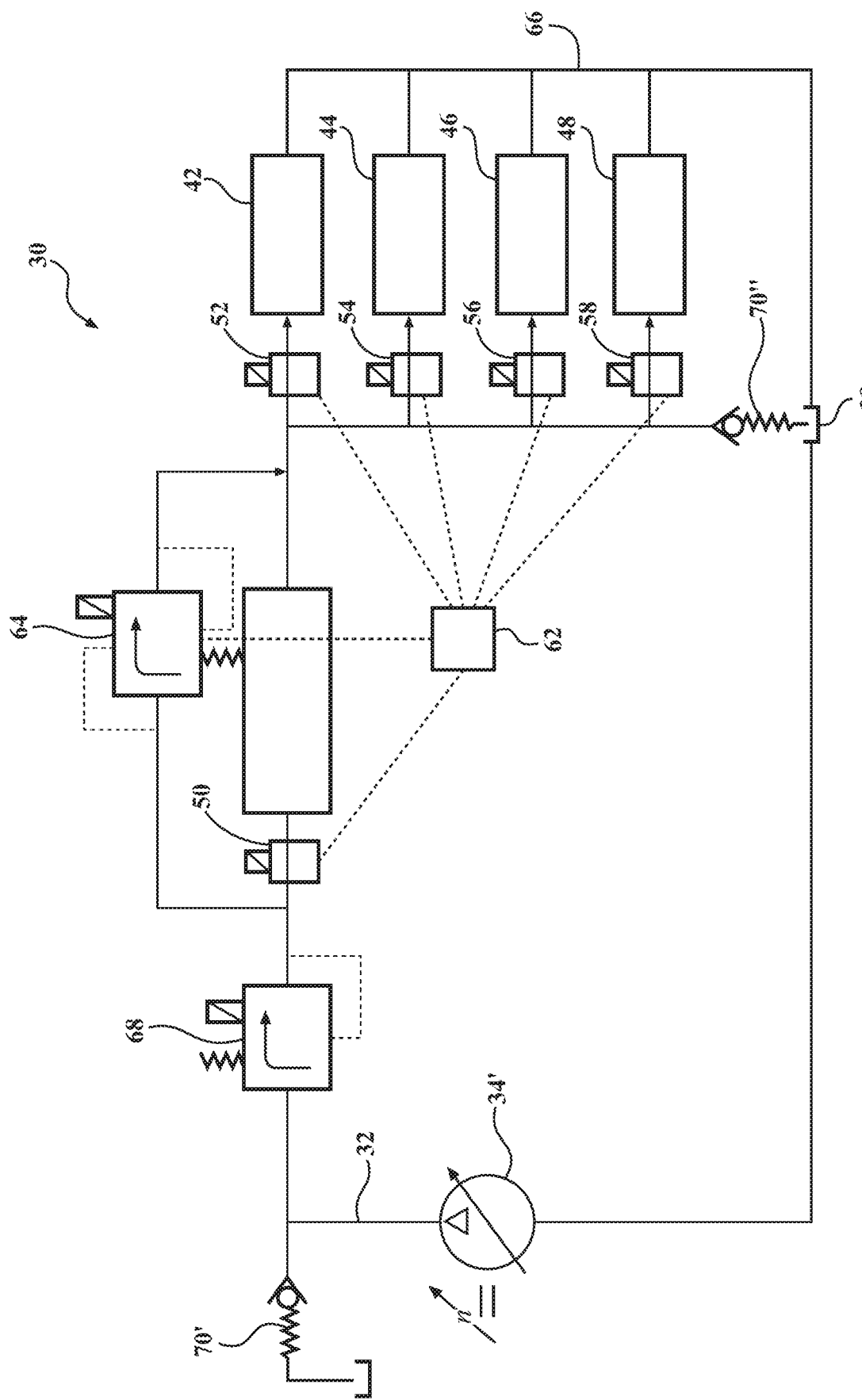
FIG. 3 is a block diagram of an alternative arrangement of the lubricant supply system for the lubricant supported electric motor according to another aspect of the disclosure.

As further illustrated in FIG. 1, the stator 12 defines a passageway 20 disposed in fluid communication with the gap 16 for introducing the lubricant 18. However, the passageway 20 could be provided on any other components of the lubricant supported electric motor 10 without departing from the subject disclosure. According to an aspect, the lubricant 18 may be cycled or pumped through the passageway 20 and into the gap 16 in various ways. For example, with reference to FIGS. 2-3, a lubricant supply system 30 can include a lubricant supply line 32 which supplies lubricant 18 to the lubricant supported electric motor 10, such as from a high pressure source (e.g., a pump) 34, 34' and a lubricant return line 36 which captures lubricant 18 exiting the lubricant supported electric motor 10 and returns the lubricant 18 to a lower pressure source (e.g., a sump) 38 of the lubricant 18. Accordingly, the lubricant 18 may move from the high pressure source 34, through the lubricant supply line 32, through the passageway 20 and into and through the gap 16, and then through the lubricant return line 36 to the lower pressure source 38. This loop forms a flow path for the lubricant 18 in the lubricant supply system 30. As illustrated in FIG. 2, a pressure control device 35 may regulate the performance of the pump 34 and the output of lubricant 18 from the pump 34 to the lubricant supply line 32 and to the lubricant supported electric motor 10. Alternatively, as illustrated in FIG. 3, the pump 34 may be a variable flow pump 34' in which pump pressure and flow are controlled by either modulating the pump motor speed or the pump displacement. Additionally, rotation of the rotor 14 relative to the stator 12 may also operate as a self-pump to drive lubricant 18 through this fluid communication loop, through the passageway 20 and into the gap 16.

As further illustrated in FIG. 1, the rotor 14 is interconnected to a drive assembly 22 for coupling the lubricant supported electric motor 10 to one of the plurality of wheels of a vehicle. For example, in one instance, the drive assembly 22 may include a planetary gear system. Alternatively, the drive assembly 22 may include one or more parallel axis gears. The stator 12 and rotor 14 are configured to exert an electromagnetic force therebetween to convert electrical energy into mechanical energy, moving the rotor 14 and ultimately driving the wheel coupled to the lubricant supported electric motor 10. The drive assemblies 22 may provide one or more reduction ratios between the lubricant supported electric motor 10 and the wheel in response to movement of the rotor 14.

As illustrated in FIGS. 2-3, the lubricant 18 supplied to the lubricant supported electric motor 10 utilizes an existing lubricant/cooling system of the powertrain for the electric or hybrid electric vehicle, namely the same lubricant/cooling supply line 32. By integrating the lubricant supported electric motor 10 into the existing lubricant supply system 30 to draw lubricant from the existing lubricant supply line 32, the lubricant supported electric motor 10 is advantageously implemented with reduced cost and complexity relative to the prior art designs, since only one lubricant supply system 30 is required for the electric or hybrid electric vehicle. Thus, in accordance with the subject disclosure, other components of the electric or hybrid electric vehicle, such as but not limited to components of a powertrain system (e.g., gearbox, power electronics, batteries, gears, wheel bearings, etc.), may use the same lubricant/coolant supply line 32 as the lubricant supported electric motor 10, minimizing cost to deploy the lubricant supported electric motor 10 in an electric or electric hybrid vehicle. It should be understood that lubricant may be used at least partially as a coolant as well as a lubricant. Accordingly, for purposes of the remaining disclosure, it should be understood that the terms "lubricant" and "coolant" may be used interchangeably herein.

As best illustrated in FIG. 2, at least one other powertrain component 42, 44, 46, 48 of the electric or hybrid electric vehicle is disposed in fluid communication with the lubricant supply line 32 and connected in parallel lubricant supply with the lubricant supported electric motor 10. The at least one powertrain component 42, 44, 46, 48 may have lubricant/coolant needs that are different from the lubricant supported electric motor 10 and thus must be controlled differently. Accordingly, a motor control valve 50 is disposed in fluid communication with the lubricant supported electric motor 10 and a component control valve 52, 54, 56, 58 is disposed in fluid communication with each powertrain component 42, 44, 46, 48. These supply control valves may be configured as variable orifice type valves or duty cycle modulated on/off type valves, for example. A capillary tube 60 may also be disposed in fluid communication between each control valve 50, 52, 54, 56, 58 and its respective component 10, 42, 44, 46, 48.

As further illustrated in FIG. 2, a controller 62 is disposed in electrical communication with the motor control valve 50 and the component control valves 52, 54, 56, 58 and configured to individually control the flow of lubricant to the connected components by way of adjusting the control valves 50, 52, 54, 56, 58 depending on the individualized needs of the lubricant supported electric motor 10 and the at least one powertrain component 42, 44, 46, 48. Thus, the powertrain controller 62 maintains pump pressure and/or flow rates sufficient to supply all of the powertrain components efficiently and effectively from one common lubricant supply line 32 of the lubricant supply system 30. As will be explained in more detail immediately below, the controller 62 can also be disposed in electrical communication with various sensors 63 in the powertrain, including those placed in communication with the lubricant supported electric motor 10 and the powertrain components 42, 44, 46, 48, for receiving information and adjusting the control valves 50, 52, 54, 56, 58 in real-time based on the operational state of the powertrain components.

According to an aspect of the disclosure, the at least one powertrain component 42, 44, 46, 48 can include a battery cooling device (e.g., heat exchanger) 42 disposed in fluid communication with the lubricant supply line 32 and connected in parallel lubricant supply with the lubricant supported electric motor 10. A first component control valve 52 is arranged in fluid communication between the lubricant supply line 32 and the battery cooling device 42, and the controller 62 is configured to independently operate the first component control valve 52 to direct lubricant/coolant 18 to the battery cooling device 42 to regulate a temperature of (i.e., cool) one or more batteries. In an arrangement, the controller 62 is also disposed in electrical communication with a temperature sensor disposed on the one or more batteries, and configured to use this temperature information to regulate the first component control valve 52.

According to an aspect of the disclose, the at least one powertrain component 42, 44, 46, 48 can also include a power electronic cooling device (e.g., radiator) 44 disposed in fluid communication with the lubricant supply line 32 and connected in parallel lubricant supply with the lubricant supported electric motor 10. A second component control valve 54 is arranged in fluid communication between the lubricant supply line 32 and the power electronic control device 44, and the controller 62 is configured to independently operate the second component control valve 54 to direct lubricant/coolant to the power electronic cooling device 44 to regulate the temperature of (i.e., cool), the power electronic cooling device 44 and connected power electronics. In an arrangement, the controller 62 is also disposed in electrical communication with a temperature sensor disposed on the connected power electronics, and configured to use this temperature information to regulate the second component control valve 54.

According to an aspect of the disclose, the at least one powertrain component 42, 44, 46, 48 can also include a gear and wheel bearing cooling device (e.g., heat sink) 46 disposed in fluid communication with the lubricant supply line 32 and connected in parallel lubricant supply with the lubricant supported electric motor 10. A third component control valve 56 is arranged in fluid communication between the lubricant supply line 32 and the gear and wheel bearing cooling device 46 and the controller 62 is configured to independently operate the third component control valve 56 to direct lubricant/coolant to the gear and wheel bearing cooling device 46 to regulate the temperature of (i.e., cool) the gear and wheel bearing cooling device 46 and the connected gears and bearings. In an arrangement, the controller 62 is also disposed in electrical communication with a temperature sensor disposed on the connected gears and bearings, and configured to use this temperature information to regulate the third component control valve 56.

According to an aspect of the disclose, the at least one powertrain component 42, 44, 46, 48 can include a motor stator cooling device (e.g., radiator) 48 disposed in fluid communication with the lubricant supply line 32 and connected in parallel lubricant supply with the lubricant supported electric motor 10. A fourth component control valve 56 is arranged in fluid communication between the lubricant supply line 32 and the motor stator cooling device 48 and the controller 62 is configured to independently operate the fourth component control valve 58 to direct lubricant/coolant to the motor stator cooling device 48 to regulate the temperature of (i.e., cool), the motor stator cooling device 48 and a connected motor stator. In an arrangement, the controller 62 is also disposed in electrical communication with a temperature sensor disposed on the motor stator, and configured to use this temperature information to regulate the fourth component control valve 58.

Other components of the powertrain system, such as climate control for a vehicle via a heat exchanger, heat pump, or radiator, can also be incorporated into the lubricant supply system 30 without departing from the scope of the subject disclosure.

As illustrated in FIG. 2, the lubricant supply system 30 may include a common sump 38 that is arranged downstream from the lubricant supported electric motor 10 and the at least one powertrain component 42, 44, 46, 48. Accordingly, after the controller 62 has effectuated control of the motor control valve 50 and the component control valves 52, 54, 56, 58, the lubricant 18 passes through the respective components and to a common, or shared, lubricant return line 36 which returns the lubricant 18 to the common sump 38 for subsequent use by the pump 34.

With reference to FIG. 3, in an alternative arrangement of the lubricant supply system 30, the at least one powertrain component 42, 44, 46, 48 of the electric or hybrid electric vehicle is disposed in fluid communication with the lubricant supply line 32 but is alternatively connected in series with the lubricant supported electric motor 10. In this arrangement, the lubricant supported electric motor 10 receives flow of lubricant 18 directly from the pump 34', i.e., the lubricant supply line 32 first passes through the lubricant supported electric motor 10 before delivering lubricant 18 to the at least one powertrain component 42, 44, 46, 48. However, in some operational circumstances, lubricant needs of the at least one powertrain component 42, 44, 46, 48 are greater than requisite lubricant flow through the lubricant supported electric motor 10. Accordingly, the lubricant supply system 30 includes a bypass valve 64 arranged in a bypass loop parallel with the lubricant supported electric motor 10. The controller 62 is also disposed in electrical communication with the bypass valve 64 and configured to open the bypass valve 64 and allow greater lubricant flow downstream of the lubricant supported electric motor 10 in response to determining that the at least one powertrain component 42, 44, 46, 48 requires additional lubricant/coolant 18. Additionally, if the requirements of the lubricant supported electric motor 10 exceed those of the downstream powertrain component 42, 44, 46, 48, the bypass valve 64 may deny the flow of lubricant/coolant to the downstream components in favor of the lubricant supported electric motor 10. Thus, the bypass valve 64 allows the controller 62 to further control the pressure and flow of the lubricant 18 to meet the lubricant and cooling needs of the at least one powertrain component 42, 44, 46, 48.

If the at least one powertrain component 42, 44, 46, 48 includes a plurality of powertrain components, such as shown in FIG. 3, each of the powertrain components 42, 44, 46, 48 are arranged parallel to one another downstream from the lubricant supported electric motor 10. The plurality of powertrain components 42, 44, 46, 48 are then disposed in fluid communication with a component return line 66 which returns the lubricant 18 to the sump 38 for subsequent use by the pump 34. Similar to the arrangement illustrated in FIG. 2, each of the powertrain components 42, 44, 46, 48 have a corresponding component control valve 52, 54, 56, 58 for controlling a flow of lubricant 18 to the respective components.

As illustrated in FIG. 3, the lubricant supply system 30 may also include a variable (i.e., adjustable) pressure regulator 68 connected to lubricant supply line 32 and disposed between the pump 36 and the lubricant supported electric motor 10. The variable pressure regulator 68 may regulate the pressure (and flow) of the lubricant/coolant 18 through the lubricant supply system 30. The controller 62 is also disposed in electrical communication with the variable pressure regulator 68 and configured to adjust the variable pressure regulator 68 depending on the needs of the components disposed in fluid communication within the lubricant supply system 30.

The lubricant supply system 30 can also include at least one pressure relief valve 70', 70" disposed along either the lubricant supply line 32 or the lubricant return line 36 for relieving lubricant pressure and returning lubricant back to the sump 38. For example, as illustrated in FIG. 3, the lubricant supply system 30 can include a first pressure relief valve 68' disposed along the lubricant supply line 32 between the pump 34 and the variable pressure regulator 68 and a second pressure relief valve 70" disposed along the lubricant return line 36 between the at least one powertrain component 42, 44, 46, 48 and the sump 38.

As will be appreciated in view of the preceding disclosure, the controller 62 addresses the efficiency, load capacity, and stiffness of the lubricant supported electric motor 10 to offer improved performance and size and weight reduction over a plain bearing or rolling element bearing system, while also controlling lubricant flow to the other powertrain components to optimize their operation. According to an aspect of the disclosure, the lubricant supported electric motor 10 may operate for extended periods of time in both a hydrostatic mode and a hydrodynamic mode. Additionally and alternatively, the lubricant supported electric motor 10 may operate for very brief periods of time in a boundary lubrication mode. In at least all of these modes, optimally controlling the lubricant supply is one objective of the lubricant supply system 30.

In hydrostatic mode (i.e., stopped and low speed operation), lubricant/coolant 18 may be supplied by the pump 34 to the hydrostatic recess areas in a bearing of the lubricant supported electric motor 10. A number of different parameters are controlled to optimize bearing performance, including but not limited to:

1) Lubricant flow to each bearing recess when stopped or in low-speed operation—Lubricant flow to each recess in the bearing may be limited to a maximum value by an orifice, such as the capillary tube 60 shown in FIG. 2, proportional valve, or a duty-cycle modulated valve, for example. This limitation to lubricant flow may enable hydrostatic centering of the rotor 14 when there is an uneven clearance gap 16 around the rotor/stator 12/14 interface of the lubricant supported electric motor 10.

2) Lubricant flow to each bearing recess when operating at high-speed—to minimize work done by the pump 34. For example, lubricant flow may be limited to hydrostatic bearing sections when hydrodynamic pressure may be adequate for bearing support. This may be accomplished by reducing the orifice size, reducing the capillary tube 60 size, reducing a pulse width modulation (PWM) valve duty cycle or by reducing lubricant supply pressure.

3) Lubricant supply pressure and flow—maintain correct lubricant flow to the lubricant supported electric motor 10. Since the lubricant supply system 30 is used by other powertrain bearings or oil-cooled equipment, modulating lubricant supply pressure/flow to insure sufficient lubricant supply for all connected recipients, components, and devices. Additionally, minimize pump 34 power requirements by supplying a minimum acceptable pressure at all times.

4) Lubricant viscosity—lubricant viscosity may be controlled by controlling lubricant temperature, mixing cooler and warmer lubricant, and/or changing lubricant grade. The lubricant supply system 30 may generate a diagnostic code to indicate inappropriate lubricant viscosity for a given operation.

5) Accumulator charge level—pre-charge the sump 38 to a high pressure at electric motor shut down to pre-condition the sump 38 for the next start of the lubricant supported electric motor 10.

6) Hydrostatic mode diagnostics—observe correct operation of the lubricant supply with at least the following parameters: lubricant supply pressure, lubricant supply temperature, lubricant supply flow, rotor centering or rotor radial vibration. One or more of these parameters may be used to generate a diagnostic indicator.

7) Lubricant supply during electric motor start—during a start of the lubricant supported electric motor 10, the hydrostatic chambers may be pressurized with lubricant, and the rotor centering may be observed. When these and other motor start conditions are met, the controller 62 permits the motor to start. For example, lubricant may be supplied by the pump 34 or the sump 38 during startup operation.

8) For emergency operation or non-normal startup operation—the controller 62 insures that sufficient lubricant remains in the bearing surface(s) for boundary lubrication to be present. Additionally and alternatively, an auxiliary wheel operated lubricant pump (not shown) may be used to supply lubricant, such as during vehicle towing operations or in other situations when the normal lubricant supply may not be available.

According to an aspect of the disclosure, in low-speed hydrostatic mode, the electric motor may require the highest level of lubricant flow to support (i.e., suspend) the rotor 14 centered in the stator 12. As discussing in accordance with FIGS. 2 and 3, other powertrain components are using the same lubricant supply system 30 and may have a low lubricant flow requirement for lubrication and cooling purposes. Thus, the controller 62 is configured to direct the lubricant flow to each component of the powertrain system depending on the particular powertrain system's lubrication and cooling requirements.

According to an aspect of the disclosure, in medium- and high-speed hydrodynamic mode, the lubricant supported electric motor 10 may require a lower level of lubricant continuously supplied. As with the hydrostatic mode, a number of parameters are controlled to insure the appropriate motor and related powertrain system operation:

1) Lubricant supply to motor hydrodynamic bearing—the controller 62 controls the lubricant flow to the lubricant supported electric motor 10 to insure appropriate bearing operation. Lubricant flow may be controlled with variable orifices, duty cycle modulated valves, and/or changing the pressure of pump 34.

2) Lubricant supply to related systems—the controller 62 assures appropriate lubricant supply to other components of the powertrain system with pump pressure control and variable valving.

3) Lubricant viscosity—lubricant/coolant viscosity may be controlled by adjusting lubricant temperature, mixing lubricant of different temperatures, and changing the grade (i.e., viscosity) of the lubricant, for example.

4) Hydrodynamic mode diagnostics—the controller 62 observes the appropriate operation of the lubricant supply with at least the following parameters: lubricant supply pressure, lubricant supply temperature, lubricant supply flow, electric motor rotor centering, or rotor radial vibration. One or more of these parameters may be used to generate a diagnostic indicator.

5) Lubricant supply during hydrostatic to hydrodynamic mode switch—in a transition from hydrostatic electric motor bearing operation to hydrodynamic electric motor bearing operation, the controller 62 insures appropriate electric motor bearing operation and minimizes operation of the lubricant pump 34 by controlling the lubricant pressure and the lubricant flow to the lubricant supported electric motor 10.

6) Lubricant supply during emergency or non-normal lubrication system operation—the controller 62 insures appropriate lubricant supply in hydrodynamic mode operation by including a wheel-driven lubricant pump (not shown) or by including self-pumping features on the electric motor bearing surfaces. For example, the rotor 14 of the lubricant supported electric motor 10 may have small spiral grooves on the raceways to draw in lubricant for hydrodynamic operation when the normal lubricant supply system 30 may be inoperative. This configuration together with a lubricant "flooded" motor housing may assure appropriate lubricant supply.

According to an aspect of the disclosure, when the lubricant supported electric motor 10 may be stopped and not in need to lubricant/cooling, the flow of lubricant to the lubricant supported electric motor 10 may be temporarily halted. Additionally and alternatively, other powertrain components 42, 44, 46, 48 downstream of the lubricant supported electric motor 10 may also encounter operating conditions where lubricant/coolant flow may not be required for lubrication and/or cooling. In these situations, the lubricant/coolant flow may be stopped to conserve energy of the pump 34.

Obviously, many modifications and variations of the present disclosure are possible in light of the above teachings and may be practiced otherwise than as specifically described while within the scope of the appended claims. Individual elements or features of a particular embodiment are generally not limited to that particular embodiment, but, where applicable, are interchangeable and can be used in a selected embodiment, even if not specifically shown or described.

What is claimed is:

1. A lubricant supply system for an electric or hybrid electric vehicle, the lubricant supply system comprising:
   a lubricant supported electric motor including a rotor rotatably disposed within a stator to define a gap therebetween;
   a lubricant supply line extending from a high pressure source to said lubricant supported electric motor for supplying lubricant to said gap and supporting said rotor within said stator;
   at least one powertrain component disposed in fluid communication with said lubricant supply line and fluidly connected in parallel with said lubricant supported electric motor for supplying lubricant to said at least one powertrain component; and
   said lubricant supported electric motor and said at least one powertrain component disposed in fluid communication with a lubricant return line for receiving lubricant exiting said lubricant supported electric motor and said at least one powertrain component and returning said received lubricant to a lower pressure source.

2. The lubricant supply system as set forth in claim 1, further comprising:
   a motor control valve disposed in fluid communication with said lubricant supported electric motor and a component control valve disposed in fluid communication with said at least one powertrain component, and
   a controller disposed in electrical communication with said motor and component control valves and configured to adjust said motor and component control valves for individually controlling a flow of lubricant to said lubricant supported electric motor and said at least one powertrain component.

3. The lubricant supply system as set forth in claim 2, wherein said controller is disposed in electrical communication with a sensor disposed in communication with each of said lubricant supported electric motor and said at least one powertrain component and said controller is further configured to adjust said motor and control valves in response to operational information received from said sensors.

4. The lubricant supply system as set forth in claim 1, wherein said rotor of said lubricant supported electric motor is operably connected to a final drive device that is interconnected to a wheel of the electric or hybrid electric vehicle.

5. The lubricant supply system as set forth in claim 1, wherein said at least one powertrain component includes at least one of a battery cooling device, a power electronic cooling device, a gear and wheel bearing cooling device, or a motor stator cooling device.

6. The lubricant supply system as set forth in claim 1, wherein said low pressure source is a common sump arranged downstream from said lubricant supported electric motor and said at least one powertrain component.

7. The lubricant supply system as set forth in claim 2, wherein said at least one powertrain component includes a plurality of powertrain components each disposed in fluid communication with said lubricant supply line and fluidly connected in parallel with said lubricant supported electric motor for supply lubricant to each of said plurality of powertrain components, and said component control valves includes a plurality of component control valves each disposed in fluid communication with a respective one of said powertrain components.

8. A lubricant supply system for an electric or hybrid electric vehicle, the lubricant supply system comprising:
   a lubricant supported electric motor including a rotor rotatably disposed within a stator to define a gap therebetween;
   a lubricant supply line extending from a high pressure source to said lubricant supported electric motor for supplying lubricant to said gap and supporting said rotor within said stator; and
   at least one powertrain component fluidly connected in series with and downstream from said lubricant supported electric motor for supplying lubricant from said lubricant supported electric motor to said at least one powertrain component.

9. The lubricant supply system as set forth in claim 8, further comprising:
   a motor control valve disposed in fluid communication with said lubricant supported electric motor and a component control valve disposed in fluid communication with said at least one powertrain component, and
   a controller disposed in electrical communication with said motor and component control valves and configured to adjust said motor and component control valves for individually controlling a flow of lubricant to said lubricant supported electric motor and said at least one powertrain component.

10. The lubricant supply system as set forth in claim 9, wherein said controller is disposed in electrical communication with a sensor disposed in communication with each of said lubricant supported electric motor and said at least one powertrain component and said controller is further configured to adjust said motor and control valves in response to operational information received from said sensors.

11. The lubricant supply system as set forth in claim 9, further comprising a bypass valve disposed in fluid communication with said fluid supply line and arranged in a bypass loop parallel with said lubricant supported electric motor, and said controller disposed in electrical communication with said bypass valve for bypassing a flow of lubricant through said lubricant electric supported motor and increasing a flow of lubricant to said at least one powertrain component.

12. The lubricant supply system as set forth in claim 11, wherein said at least one powertrain component includes a plurality of powertrain components each arranged parallel to one another downstream from said lubricant supported electric motor.

13. The lubricant supply system as set forth in claim 8, further comprising a variable pressure regulator connected to said lubricant supply line and disposed between said high pressure source and said lubricant supported electric motor, and said controller disposed in electrical communication with said variable pressure regulator.

14. The lubricant supply system as set forth in claim 13, further comprising a pressure relief valve disposed along said lubricant supply line between said high pressure source and said variable pressure regulator.

15. The lubricant supply system as set forth in claim 8, wherein said rotor of said lubricant supported electric motor is operably connected to a final drive device that is interconnected to a wheel of the electric or hybrid electric vehicle.

16. The lubricant supply system as set forth in claim 8, wherein said at least one powertrain component includes at least one of a battery cooling device, a power electronic cooling device, a gear and wheel bearing cooling device, or a motor stator cooling device.

17. The lubricant supply system as set forth in claim 8, wherein said lubricant supported electric motor and said at least one powertrain component and each disposed in fluid communication with a common low pressure source for returning lubricant exiting said lubricant supported electric motor and said at least one powertrain component to said lower pressure source.

18. The lubricant supply system as set forth in claim 8, wherein said low pressure source is a common sump arranged downstream from said lubricant supported electric motor and said at least one powertrain component.

* * * * *